United States Patent
Tiffin et al.

[15] 3,666,162
[45] May 30, 1972

[54] FOAMED POLYMER CUP AND METHOD FOR MAKING SAME

[72] Inventors: James R. Tiffin, 710 Colgate Lane, Newark, Del. 19711; Earl Erdman, 117 Carlie Rd., Lynnfield, Wilmington, Del. 19803

[22] Filed: June 7, 1966

[21] Appl. No.: 555,922

Related U.S. Application Data

[63] Continuation of Ser. No. 261,683, Feb. 28, 1963, abandoned.

[52] U.S. Cl. .......................... 229/1.5 B, 229/3.5 R, 264/48, 264/92, 264/321
[51] Int. Cl. .................................. B29c 17/03, B29d 27/00
[58] Field of Search ................... 264/92, 98, 48, 51, 53; 229/1.5

[56] References Cited

UNITED STATES PATENTS

| | | | |
|---|---|---|---|
| 2,893,877 | 7/1959 | Nickolls | 264/53 X |
| 3,039,911 | 6/1962 | Fox | 264/92 X |
| 2,905,350 | 9/1951 | Edwards | 229/1 |
| 2,917,217 | 12/1959 | Sisson | 229/4.5 |
| 3,011,217 | 12/1951 | Carlson | 264/53 |
| 3,042,972 | 7/1962 | Lafferty | 264/53 |
| 3,111,710 | 11/1963 | Plymale | 264/53 |

FOREIGN PATENTS OR APPLICATIONS

| | | | |
|---|---|---|---|
| 854,586 | 11/1960 | Great Britain | 264/53 |

OTHER PUBLICATIONS

Collins, " Controlled Density Foam," in SPE Journal, pp. 705– 09, July, 1960.

Primary Examiner—Robert F. White
Assistant Examiner—Allen M. Sokal
Attorney—Cushman, Darby & Cushman

[57] ABSTRACT

An improved polystyrene vending machine cup is made by vacuum forming and deep drawing a sheet consisting of a closed cell foam resin core with a nonporous, smooth tough resin skin on both sides of the core. The sheet is formed by extrusion of a hot sheet of foamable thermoplastic resin and quench chilling the surfaces of the sheet to form the skins on each side of the core. The cup can be held in the hand when filled with material having a temperature of 100° C.

6 Claims, 8 Drawing Figures

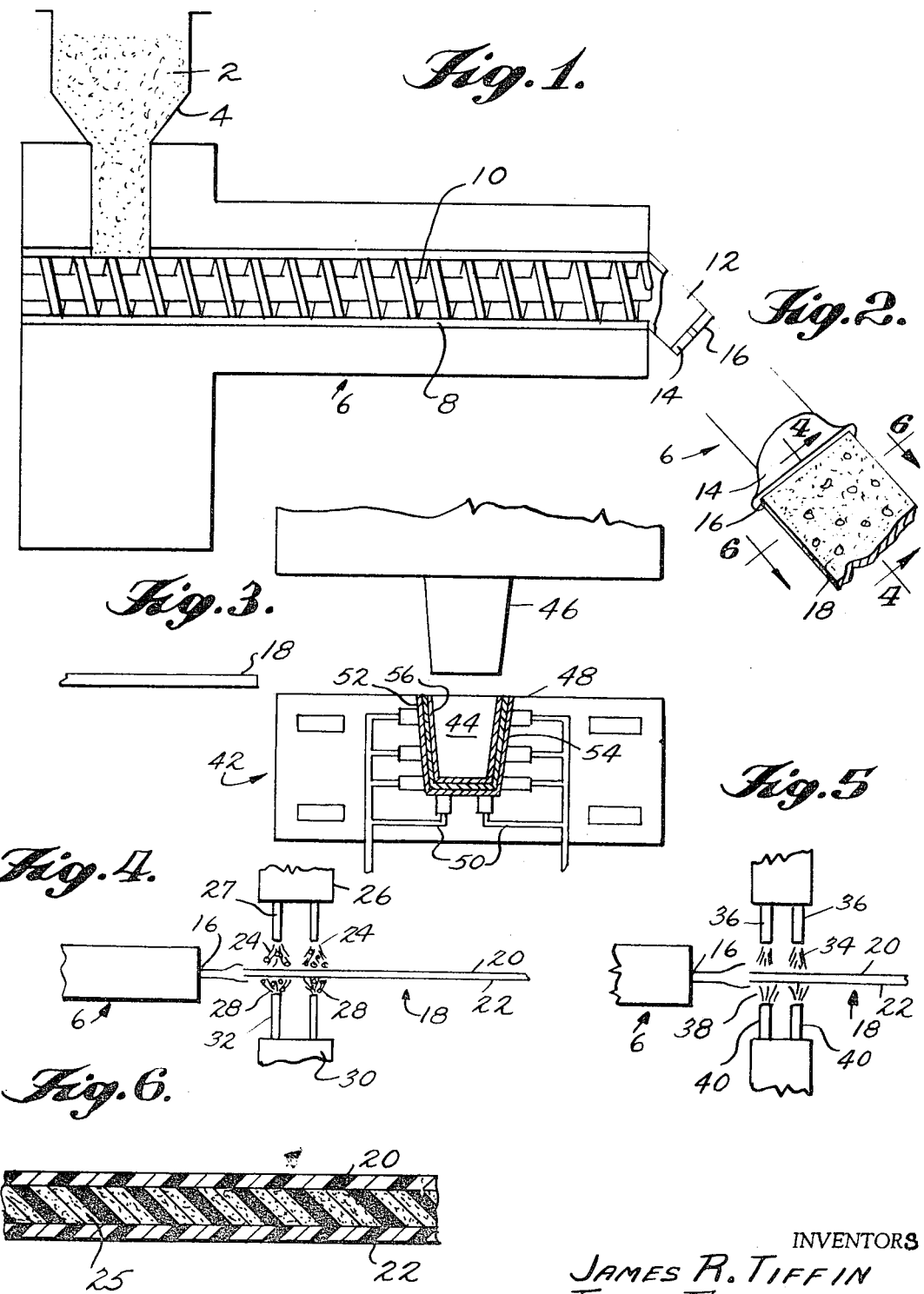

INVENTORS
JAMES R. TIFFIN
BY EARL ERDMAN
Cushman, Darby & Cushman
ATTORNEYS

FOAMED POLYMER CUP AND METHOD FOR MAKING SAME

The present application is a continuation of application Ser. No. 261,683, filed Feb. 28, 1963 and now abandoned.

The present invention relates to the preparation of containers from foamed polystyrene and other thermoplastic resins.

It has been proposed to vacuum form foamed polystyrene and other thermoplastic resins to prepare cups and other containers, e.g. Lafferty U.S. Pat. No., 3,042,972. There is normally difficulty in vacuum forming foamed sheets because of the porosity of the product.

It has been proposed in the past to chill an expansible sheet of thermoplastic resin as it comes out of the extruder. Such chilling is done prior to the time any substantial expansion or foaming takes place as in the Lafferty patent above and in Carlson U.S. Pat. No., 3,011,217. When vacuum forming is employed and the expansible material is foamed difficulty is encountered due to the three dimensional nature of the expansion.

It has also been proposed in Aykanian et al., U.S. Pat. Nos., 2,905,972 and 2,945,261, to foam a thermoplastic resin as it emerges from an extruder. The expansion is allowed to continue until the foam contacts into pressure contact with the surface of a forming die. The foam prepared in such a manner is of low density, e.g. not over 6 lbs./cu. ft. The Aykanian et al., patents highlight the fact that attempts to prepare foamed thermoplastic resins directly by extrusion means have been unsuccessful, since when such resins are extruded into air above their foaming temperatures, they foam into wrinkled, corrugated structures. Aykanian et al., also indicate that their products are in the final formed condition and do not indicate that their products can be worked into other shapes. Carlson U.S. Pat. No., 2,857,625, is similar to the Aykanian et al., patents.

It is an object of the present invention to develop a novel method for forming a nonporous, tough skin on foamed thermoplastic resins.

Another object is to obtain a surface on foamed thermoplastic resins, e.g. polystyrene, more mechanically stable in further finishing operations.

A further object is to prepare cups and other containers from foamed polystyrene and other foamed thermoplastic resins having a smoother, cleaner, less absorbent surface and an overall better appearance.

An additional object is to prepare wrinkle and distortion free vacuum formed foamed thermoplastic resins.

Another object is to prepare high density foamed sheets of thermoplastic resins, e.g. polystyrene, from which containers can be vacuum formed.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming a tough skin on the foamed sheet of thermoplastic resin as it comes out of the extruder. The skin is formed by rapid chilling of the surfaces of the sheet as it comes out of the extruder while not chilling the major portion of the sheet whereby it continues to expand to form the foam.

The invention will be understood best in connection with the drawings wherein:

FIG. 1 is a sectional view of an extruder for the foam;

FIG. 2 is a perspective view showing the foam sheet as it comes out of the extruder;

FIG. 3 is a somewhat schematic sectional view of a vacuum cup former;

FIG. 4 is a schematic view taken along the line 4—4 of FIG. 2;

FIG. 5 is a schematic view of an alternative chilling device;

FIG. 6 is a sectional view along the line 6—6 of FIG. 2;

Figure 7:
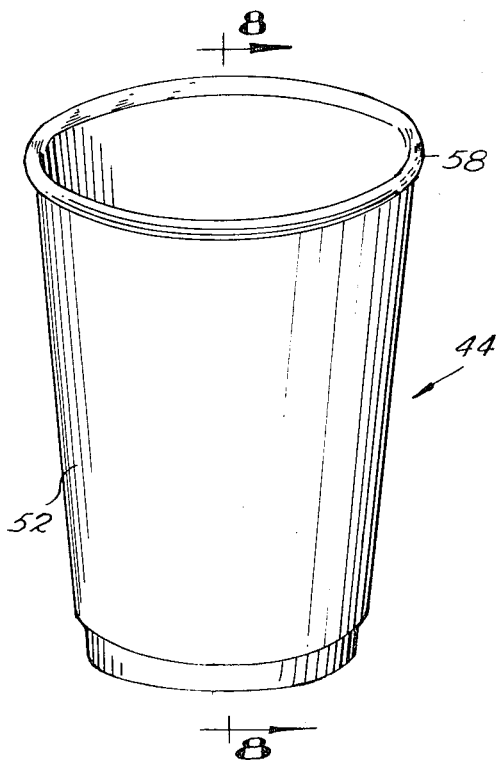
FIG. 7 is a vertical elevation of a cup made according to the invention.
Figure 8:
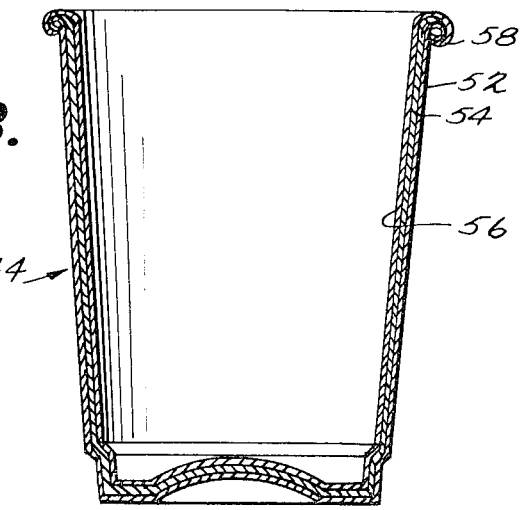
FIG. 8 is a sectional view along the line 7—7 of FIG. 7.

Referring more specifically to FIG. 1 of the drawings, there are provided pellets of a composition containing 50 parts of the high impact polystyrene (Foster Grant's Tuflex 216, polystyrene modified with 5 percent polybutadiene) and 50 parts of regular crystal polystyrene (Koppers Dylene 8). This composition is called hereinafter Composition A.

90 parts of Composition A were tumbled for 5 to 10 minutes with 10 parts of Dow Pelespan 101 (expansible polystyrene beads containing 6 percent pentane) and 0.5 part of Bayol 35 (a petroleum aliphatic hydrocarbon white oil). The tumbling was carried out at room temperature. There were then added 0.3 part of powdered anhydrous citric acid and 0.4 parts of powdered sodium bicarbonate and the mixture tumbled for an additional 15 to 20 minutes. The resulting mixture 2 was added to the hopper zone 4 of a conventional plastic extruder 6. The hopper zone had a temperature of 225° F. The plastic mixture then passed into the barrel 8 of the extruder where it was softened and kneaded within the barrel with the aid of screw 10. The temperature within the barrel was 325°–350° F. The pressure within the barrel as measured at the discharge end was 2,500 psi and the temperature at the adapter was 340° F. The plastic then entered die 14 and was extruded through land aperture or slot opening 16 to form a foamed polystyrene sheet 18. The sheet has a temperature of about 300° F. as it emerges from the extruder. It remains dense for about 0.5 inch before it starts to expand or swell. When expansion occurs it does so in all three dimensions. The sheet as it emerges from the slot 16 has a thickness of 35 mils. Within a fraction of an inch of the slot 16 the top surface 20 of the sheet 18 is rapidly chilled by means of mixed air and water blasts 24 from pressure mixer 26 via nozzle 27 while simultaneously the bottom surface 22 of the sheet 18 is rapidly chilled by mixed air and water blasts 28 from pressure mixer 30 via nozzle 32 as shown in FIG. 4. Alternatively the air and water can be applied through separate nozzles, an alternative modification is shown in FIG. 5 wherein no water is employed but instead air 34 is blasted through nozzles 36 upon the upper surface 20 and air 38 is blasted through nozzles 40 upon lower surface 22. In place of air other inert gases can be used, e.g. nitrogen, argon, carbon dioxide, helium, etc. The air was blasted at 50 feet/sec. at room temperature (70° F.). The exact temperature and velocity of the air and/or water chillant is not critical. The critical feature is that the polystyrene (or other thermoplastic resin) surface be cooled rapidly below its yield point so that essentially no bubbles form on the surfaces of the sheet while the inside of the sheet retains sufficient heat to foam well. The air temperature and velocity are controlled so as to cool just the skin, i.e. about 3 to 15 percent at the top of the sheet and about 3 to 15 percent at the bottom of the sheet while not cooling the remainder of the sheet so that the majority of the sheet will still foam. If the cooling is too great, then the sheet will not expand at all. Those skilled in the art, however, can readily control the chilling so that it is neither too little or too great. In the specific example the sheet after the chilling expanded to a total thickness of about 90 mils. The top skin 20 and bottom skin 22 were each 5 mils thick and the core 25 was about 80 mils thick.

The chilling produced a top skin and bottom skin which were substantially bubble free and smooth and produced containers having a good appearance, and having good insulating properties. The products, e.g. cups were less absorbent than products made from conventional foamed polystyrene sheets.

The chilling treatment also prevented wrinkling and distortion of the foamed polystyrene sheet and gave a smoother, cleaner surface which was more mechanically resistant during the requisite further finishing operations. Consequently, it was easier to work with the sheet. The foamed sheet having the top and bottom skins had a density of 25 lbs./cu. ft.

The invention is particularly adapted to making high density foamed sheets, e.g. 18–45 lbs./cu. ft. and preferably 20–35 lbs./cu. ft.

The sheet as it comes from the extruder must be at least 5 mils thick and generally is 25–45 mils. The foamed sheet is usually 60–120 mils thick, preferably 85–90 mils, although the sheet can be as thick as 300 mils. Each skin is usually 5–10 mils thick. Since the outer skins are essentially unexpanded they are of considerably higher density than the foamed core, e.g. they can have a density of 60–66 lbs./cu.ft.

The temperature within the extruder can be varied in conventional manner, e.g. it is preferably between 270° and 340° F., although temperatures up to 450° F. can be employed. The pressure in the extruder at the adapter is usually 1,000–4,000 psi and the pressure in the die of the extruder about 500–1,500 psi when using polystyrene. In the specific example the pressure in the die was 1,000 psi and in the barrel it was 2,500 psi.

The foamed sheet 18 as shown schematically in FIG. 3, was heated until pliable and then was passed over vacuum former 42 where it was deep drawn to form a cup and then allowed to cool. The vacuum former includes a male member or plug 46 and a female die 48 having vacuum lines 50 therein. The vacuum drawing can be carried out in any conventional fashion, e.g. as shown in Caine application, Ser. No. 176,148 filed Feb. 27, 1962 as a division of application, Ser. No. 711,739, Jan. 28, 1958, now U.S. Pat. No. 3,045,887. The extruded sheet of polystyrene having a foamed core and integral top and bottom unfoamed skins can be formed in the same manner as regular unfoamed polystyrene. In the thermo forming the three layer sheet is stretched to form the cup. The stretching reduces the thickness of the sheet, e.g. from 85–90 mils to 25–40 mils at the center of the cup. This thickness can be varied from 10–50 mils while still retaining the ability to be used as a hot drink container while at the same time not being unduly bulky.

The cup 44 is made up of an integral three layer unit consisting of an unfoamed outer skin 52, a foamed core 54 and an unfoamed inner skin 56. In the vacuum forming the relative thickness of the three layers is not altered materially. It is to be understood that some areas of the cup are not stretched as much as others. Thus the thickness under the lip 58 can be as high as 60 mils while the mid portion of the cup is 35–40 mils thick. The bottom of the cup also is usually thicker than the mid portion. The lip can be formed in any convenient manner either as a bead, a flange or otherwise.

Cups formed by the present process having a thickness of as little as 10 mils or as high as 40 or 50 mils, had an insulating value sufficient that even when they contained boiling water, aqueous coffee, aqueous tea or aqueous chocolate, they could be held comfortably in the hand. In contrast conventional hot drink cups of lower density foams have thickness of 80 mils or over. Thus the present cups are nestable in vending machines and elsewhere in a lesser space than conventional foamed cups.

For best resultings a nucleating agent should be used in forming the foamed composition, as described in Erdman application, Ser. No. 244,382 filed Dec. 13, 1962. The entire disclosure of the Erdman application is hereby incorporated by reference.

Thus there can be used a composition containing 50–95 percent of nonfoaming polystyrene, e.g. regular polystyrene and/or high impact polystyrene and 5–50 percent expansible polystyrene. When a nucleating agent is employed it is used in an amount of from 0.02 to 10 percent of the total polystyrene by weight. Preferably 0.4 to 2 percent of the nucleating agent is used.

Conventionally nucleating agents made up of two materials which react to form carbon dioxide and water can be used. The two materials are normally used in approximately equivalent amounts. As the carbon dioxide liberating materials there can be used ammonium, alkali and alkaline earth carbonates or bicarbonates, e.g. ammonium bicarbonate, sodium bicarbonate, sodium carbonate, potassium bicarbonate or calcium carbonate. The other material is an acid or acid reacting salt, preferably solid, which is sufficiently strong to liberate the carbon dioxide from the carbonate or bicarbonate. Generally the acid has at least 3.0 milliequivalents of acidic hydrogen and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate chloroacetic acid, maleic acid, succinic acid, phthalic acid. In place of the anhydrous acids or salts there can be used the solid hydrates, e.g. oxalic acid dihydrate and citric acid monohydrate.

Suitable foaming agents for the thermoplastic resins are well known and the selection of the particular foaming agent to be employed is dictated primarily by the particular thermoplastic resin in which it is to be incorporated. The preferred foaming agents are nonreactive liquids which have not more than a slight solvent action on the thermoplastic resin and which volatilize below the softening point of the thermoplastic resin. Usually the resin, e.g. expansible polystyrene contains 1 to 15 percent of a volatile liquid, preferably 4.5 to 9 percent by weight. The liquid preferably boils below 100° C. Typical examples of suitable foaming agents include aliphatic hydrocarbons boiling between 10° and 100° C. and preferably between 30° and 90° C., e.g. petroleum ether (containing primarily pentane or hexane or a mixture of these hydrocarbons), pentane, hexane, isopentane, heptane, cyclohexane, cyclopentane, pentadiene, and neopentane. Other volatile liquids include methanol, ethanol, methyl acetate, ethyl acetate, acetone, methyl formate, ethyl formate, dichloroethylene, isopropyl chloride, propionaldehyde, diisopropyl ether, trichlorofluoromethane, a mixture of pentane with 5–30 percent of a lower halogenated hydrocarbon such as methylene chloride.

While not essential there can also be added a wetting agent such as Bayol 35, kerosene having an average of at least eight carbon atoms in the molecule, alkylphenol-alkylene oxide adducts, e.g. Triton X–100 (t-octylphenol-ethylene oxide adduct having 10 ethylene oxide units in the molecule), sodium lauryl sulfate and sodium dodecylbenzene sulfonate. The wetting agents can be nonionic or anionic.

The foams prepared normally have closed cells of uniform size, usually with a cell diameter of from 0.01 to 0.5 mm.

When employing polystyrene there can be employed normal crystal grade polystyrene or high impact polystyrene or a mixture containing 5 to 95 percent normal crystal grade polystyrene and the balance high impact polystyrene. When employing a thermoplastic styrene polymer it normally contains greater that 50 percent by weight of styrene and preferably at least 70 percent by weight of styrene in its structure. High impact polystyrenes are frequently prepared by polymerizing monomeric styrene in the presence of 2½ to 10 percent by weight of a rubbery diene polymer or by polymerizing styrene in the presence of such amounts of a difunctional material. Examples of high impact styrenes include a terpolymer of 5 percent acrylonitrile, 5 percent butadiene and 90 percent styrene; a copolymer of 5 percent butadiene and 95 percent styrene; the product made by polymerizing 95 percent of styrene in the presence of 5 percent of polybutadiene; a copolymer of 5 percent chlorosulfonated polyethylene and 95 percent styrene; a blend of 97.5 percent polystyrene and 2.5 percent polybutadiene; a blend of 95 percent polystyrene and 5 percent of hydrogenated polybutadiene containing 35.4 percent residual unsaturation; polystyrene formed in the presence of 5 percent hydrogenated polybutadiene containing 4.5 percent of residual unsaturation; a blend of a 5 percent polystyrene and 5 percent polyisoprene, and a copolymer of 99.5 percent styrene and 0.5 percent divinyl benzene.

Unless other wise indicated all parts and percentages are by weight.

The foamable thermoplastic resins which can be extruded according to the invention include cellulose ethers and esters, e.g. ethyl cellulose, cellulose acetate, cellulose acetate-butyrate, homopolymers and interpolymers of monomeric compounds containing the

grouping such as olefins, e.g. ethylene, propylene, isobutylene, vinyl halides, e.g. vinyl chloride; vinylidene chloride; vinyl esters of carboxylic acids; e.g. vinyl acetate; vinyl stearate, vinyl benzoate; vinyl ethers, e.g. vinyl methyl ether; vinyl ethyl ether, vinyl isobutyl ether; unsaturated carboxylic acids and derivatives thereof, e.g. acrylic acid, methacrylic acid, methyl acrylate, ethyl acrylate, methyl methacrylate, acrylamide, acrylonitrile, methacrylonitrile, and interpolymers of the above mentioned vinylidene monomers with alpha, beta-unsaturated polycarboxylic acids and derivatives thereof, e.g. maleic anhydride, diethyl maleate, dibutyl fumarate, diallyl maleate, dipropyl maleate, etc. A preferred class of materials with which optimum results are obtained are rigid, relatively nonelastic thermoplastic resins such as homopolymers of vinylidene aromatic hydrocarbons and ring halogenated derivatives thereof, e.g. styrene, o-chlorostyrene, p-chlorostyrene, 2,5-dichlorostyrene, 2,4-dichlorostyrene, p-methylstyrene, p-ethylstyrene, alpha-methylstyrene, vinyl naphthylene and interpolymers of such vinylidene monomers with each other and with other vinylidene monomers in which the interpolymer contains at least 70 percent of the vinylidene aromatic hydrocarbon compound, e.g. a copolymer of 70 percent styrene and 30 percent acrylonitrile. As previously indicated the most preferred resins are thermoplastic styrene polymers containing at least 70 percent by weight styrene in the structures.

Other suitable thermoplastic resins include polycarbonates, e.g. the polymer from bisphenol A and diphenyl carbonate; polyurethanes, e.g. from toluene diisocyanate and polypropylene glycol molecular weight 2025; Dacron (polyethylene terephthalate), nylon (e.g. polymeric hexamethylene adipamide).

While the invention is of particular importance in the manufacture of cups it is also useful in preparing other open containers such as food trays, buckets, plates and other foamed articles, e.g. face masks. The containers can be used to package cheese, ice cream or other foodstuff.

The articles are preferably made by vacuum drawing the foamed thermoplastic resin sheet. The invention is particularly valuable in vacuum drawing because of the elimination of the troubles normally encountered in vacuum forming porous sheets.

The term "integrally united" as used herein means a direct union of the inner core with the outer skins without the use of an adhesive or other intermediate material.

The three layer sheet after foaming of the core can be vacuum formed immediately or it can be stored, e.g. in roll form and subsequently heated to a temperature sufficient to permit vacuum forming.

We claim:
1. A process of thermoforming a closed cell thermoplastic styrene resin foam sheet into a seamless cup, said sheet being wrinkle and distortion free and having a thickness of 60 to 120 mils and a density between 18 and 45 lbs./cu. ft. and consisting of (1) a closed cell foam resin core, (2) a nonporous, smooth, tough resin outer skin on one side of the core, and (3) a nonporous, smooth, tough resin skin on the other side of the core, said core comprising over 50 percent of the total thickness of said skins and core, said core being integral with said skins and being composed of the identical material as said skins, said skins having a substantially higher density than said core and each skin being at least 3 percent of the total thickness of the skins and core, said sheet having been formed by extrusion of a hot sheet of foamable thermoplastic resin and quench chilling the surfaces of said sheet to form said skins on each side of said core, said process comprising supplying sufficient heat to thermoform said sheet and thermoforming said sheet by vacuum forming and deep drawing into a cup having wall means and a core density of 18 to 45 lbs./cu. ft., a major portion of said cup wall means having a thickness between 10 and 50 mils., said cup being characterized by being capable of being held in the hand when filled with material having a temperature of 100° C. and being nestable in vending machines in a lesser space than lower density foams, said wall means being in stretched condition.

2. A process according to claim 1 wherein the sheet prior to vacuum forming has a thickness of 85–90 mils and a density of 20–35 lbs./cu. ft. and the core is at least 70 percent of the total thickness of the core and skins and the major portion of the cup wall means has a thickness between 25 and 40 mils.

3. A process according to claim 2 wherein the starting foamed sheet is one which has been foamed with the aid of a nucleating agent and the closed cells have a cell diameter of 0.01 to 0.5 mm.

4. A process according to claim 1 wherein the deep drawing is to an extent sufficient to reduce the thickness of the sheet to at least about one-half its original thickness in the major portion of the cup wall means.

5. A cup made by the process of claim 1.

6. A cup having wall means, said cup having been made by a process comprising forming a foam sheet by extrusion of a hot, wrinkle and distortion free sheet of foamable thermoplastic styrene polymer having a thickness of 85 to 90 mils and a density of 35 lbs./cu.ft. and quench chilling the surfaces of said sheet to form a sheet consisting of (1) a closed cell foam resin core, (2) a nonporous, smooth, tough resin outer skin on one side of the core, and (3) a nonporous, smooth, tough resin skin on the other side of the core, said core comprising over 50 percent of the total thickness of said skins and core, said core being integral with said skins and being composed of the identical material as said skins, said skins having a substantially higher density than said core and each skin being at least 3 percent of the total thickness of the skins and core, and supplying sufficient heat to thermoform said sheet and thermoforming said sheet into a cup having a core density of 12 to 45 lbs./cu.ft., said wall means being in stretched condition.

* * * * *